United States Patent [19]

Reichel et al.

[11] Patent Number: 4,571,717
[45] Date of Patent: Feb. 18, 1986

[54] ADAPTER FOR A PLUG-IN CARTRIDGE

[75] Inventors: Kenneth Reichel, Hudson; Frederick W. Nichols, III, Akron; Norm Levenstein, Munroe Falls, all of Ohio

[73] Assignee: Kabushiki Kaisha Audio-Technica, Tokyo, Japan

[21] Appl. No.: 708,975

[22] Filed: Mar. 7, 1985

Related U.S. Application Data

[63] Continuation-in-part of Ser. No. 561,676, Dec. 15, 1983, abandoned.

[30] Foreign Application Priority Data

Dec. 16, 1982 [JP] Japan .................. 57-190223

[51] Int. Cl.[4] .................. G11B 3/04; G11B 21/16
[52] U.S. Cl. .................. 369/256; 339/154 A; 369/170; 369/172
[58] Field of Search .............. 369/256, 170, 172, 171, 369/173; 339/153, 154, 155 T, 156

[56] References Cited

U.S. PATENT DOCUMENTS

| | | | |
|---|---|---|---|
| 3,629,789 | 12/1971 | Szeremy | 369/156 R |
| 3,679,843 | 7/1972 | Cho | 369/172 |
| 3,688,244 | 8/1972 | Savoca | 339/154 A |
| 3,812,451 | 5/1974 | Buglewitz | 339/156 R |
| 4,276,635 | 6/1981 | Obata et al. | 369/256 |
| 4,325,132 | 4/1982 | Kuehn | 369/256 |
| 4,385,375 | 5/1983 | Okura et al. | 369/172 |

FOREIGN PATENT DOCUMENTS

| | | | |
|---|---|---|---|
| 2116447 | 11/1971 | Fed. Rep. of Germany | 369/256 |
| 223337 | 9/1924 | United Kingdom | 339/155 T |

Primary Examiner—Steven L. Stephan
Attorney, Agent, or Firm—Welsh & Katz, Ltd.

[57] ABSTRACT

An adapter for a phonographic tone arm for interchangeable mounting of a plug-in cartridge of a linear tracking arm to a head shell of an offset tone arm. The plug-in cartridge has a predetermined mass and center of gravity and has a plurality of small diameter contact pins projecting from the cartridge. The cartridge housing is secured to the head shell by the adapter which has a housing with a recess for accepting the cartridge. The adapter also includes a plurality of hollow terminal pins for receiving the contact pins of the plug-in cartridge. The predetermined mass and center of gravity for the plug-in cartridge enables attaining a predetermined tone arm balance without balance adjustment being necessary. The adapter housing also includes at least one groove for attenuating undesirable acoustic vibrations present in the tone arm.

2 Claims, 3 Drawing Figures

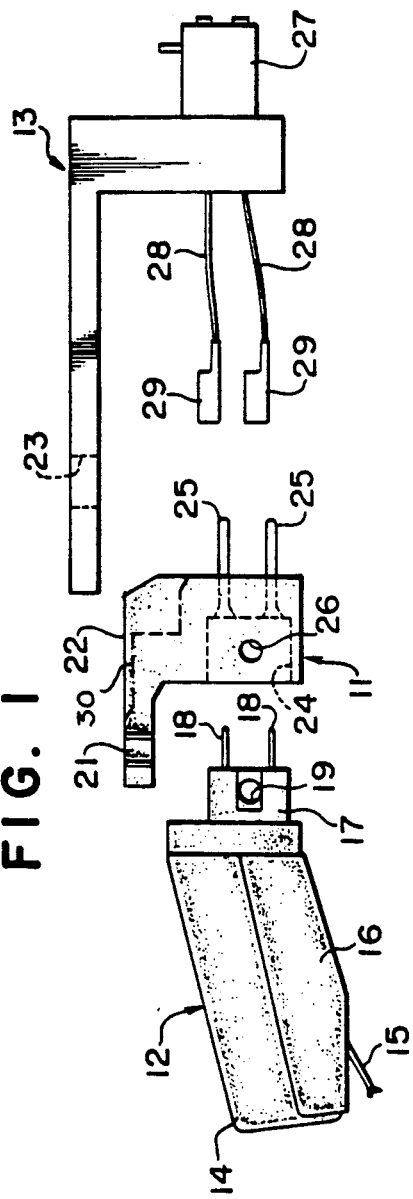
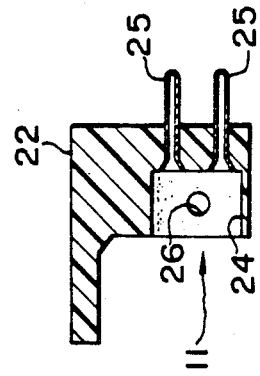
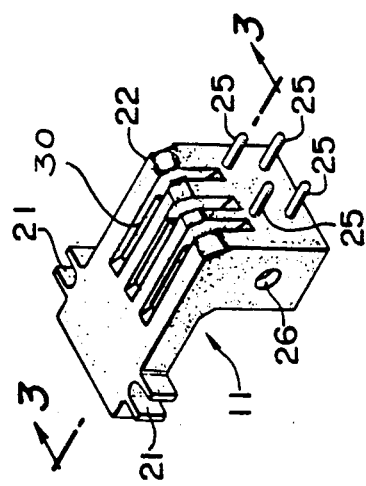
FIG. 1
FIG. 3
FIG. 2

ADAPTER FOR A PLUG-IN CARTRIDGE

This application is a continuation-in-part of an application filed on Dec. 15, 1983, Ser. No. 561,676, now abandoned.

BACKGROUND OF THE INVENTION

The present invention relates generally to an improved plug-in cartridge adapter in a phonograph pickup. More particularly, the invention relates to a cartridge adapter which enables a plug-in cartridge for a linear tracking arm to be mounted on an offset arm such that a minimum of manual operations are required to change cartridges and tone arm imbalance is not introduced in the change of cartridge.

Recently, there has been extensive use in the phonographic arts of a linear tracking arm which is designed so that a tone arm is moved both linearly and radially with respect to a recording disc (see, for example, U.S. Pat. No. 3,572,724). The advantage of a linear tracking arm is that no inside force is generated since the cantilever of the cartridge is always directed perpendicular to the modulated groove of the recording disc. Normally, a plug-in type cartridge is used for the linear tracking arm wherein the cartridge is directly inserted into a female connector mounted at the tip of the tone arm. The linear tracking arm and cartridge are designed to be compact, and the terminal pins are smaller in diameter than those of prior art cartridges. By way of comparison the cartridge for an offset arm generally has mounting holes which are spaced about one-half inch apart, and the cartridge is fixed by two screws to the head shell which is coupled to the tone arm. The linear tracking plug-in cartridge is not however provided with mounting means for the conventional offset arm head shell, and the diameter of each of the output terminal pins is too small for the female connectors on conventional offset arm head shells. Hence, the linear tracking plug-in cartridge is incompatible with conventional offset tone arms.

BRIEF SUMMARY OF THE INVENTION

It is an object of the invention to provide an improved, phonographic tone arm adapter which enables mounting of a plug-in cartridge from a linear tracking arm to a conventional offset tone arm.

It is a further object of the invention to provide an improved phonographic tone arm adapter in which plug-in cartridges can be mounted in either a linear tracking or an offset tone arm and still maintain tone arm balance without requiring adjustment thereof.

It is another object of the invention to provide an improved phonographic tone arm adapter which has recessed grooves for attenuating undesirable acoustic vibrations.

In accordance with the invention, a phonographic tone arm adapter is used for mounting a plug-in cartridge of a linear tracking tone arm to a head shell of an offset tone arm. An adapter housing of the plug-in cartridge has a recess and a plurality of hollow terminal pins for accepting, respectively, a plug-in cartridge and coupled contact pins. The plug-in cartridge is easily replaced with another type of cartridge by means of the adapter, and the cartridge when mounted with the tone arm has a combined predetermined mass and center of gravity. Therefore, a user can easily install a replacement cartridge in the fixed adapter housing, and the tone arm maintains a balanced state without having to undergo adjustment. The adapter housing also includes at least one groove for attenuating unwanted acoustic vibrations present in the tone arm.

Other objects and advantages of the present invention, together with the organization and manner of operation thereof, will become apparent from the following detailed description of the invention taken in conjunction with the accompanying drawings.

BRIEF DESCRIPTION OF THE DRAWINGS

FIG. 1 is an exploded view of a tone arm adapter used to mount a plug-in cartridge onto a head shell;

FIG. 2 is a perspective end view of the adapter; and

FIG. 3 is a sectional view taken along line 3—3 of FIG. 2.

DESCRIPTION OF PREFERRED EMBODIMENTS

An adapter constructed in accordance with one embodiment of the present invention is generally indicated at 11 in FIG. 1, which also shows a plug-in cartridge, generally indicated at 12, mounted on a head shell 13 with the intervening adapter 11. The plug-in cartridge 12 comprises a cartridge body 14 and a stylus structure 16 having a stylus 15 exchangeably mounted on the cartridge body 14. At the rear of the cartridge body 14 is an integral boss member 17 which fits into a recess 24 of a linear tracking arm (not shown). The boss member 17 is provided with four output terminal pins 18 having a diameter of approximately 0.75 mm. Apertures 19 receive fastening screws (not shown) for fixing the cartridge 12 to the adapter 11. The cartridge 12 combined with the arm preferably has a fixed, predetermined mass and center of gravity in order to enable interchange of various cartridges without having to readjust the balance of the tone arm. Examples of such cartridges are of the four terminal, push-in type or a "P-mount" cartridge, which are well known in the art, and are suitable for both offset and linear tracking arms.

Referring to FIGS. 1 and 2, the adapter 11 is used to mount the plug-in cartridge 12 on the head shell 13. The adapter 11 has a housing 22 with upper sides which have a pair of mounting holes 21, arranged about one-half inch apart in a spaced apart relation. The spacing of one-half inch is in accordance with Japanese Industrial Standards, and the head shell 13 likewise has a pair of cartridge retaining holes 23, arranged in a spaced apart relation of one-half inch. The housing 22 is provided with the recess 24 in which the boss member 17 is accepted. Four relay terminal pins 25 extend from the recess 24 and are arranged to receive each corresponding one of the output terminal pins 18. Screw receiving holes 26 are formed in both side walls of the recess 24 so as to match with the apertures 19. The relay terminal pins 25 are in the form of hollow pipes which have open ends to allow close contact with the output terminal pins 18. The outside diameter (approximately 1.25 mm) is nearly the same size as the usual output terminal pins of an offset arm cartridge. Thus, there can be used without modification general connector means, such as flexible connections 29 mounted on the end of lead wire connections 28 which extend from a male connector 27 of the head shell 13. The connections to the male connector 27 and the terminal pins 25 can be demountable couplers or permanent, fixed couplings.

The plug-in cartridge 12 is mounted on the head shell 13 for the offset arm by inserting the boss member 17 of the plug-in cartridge 12 into the recess 24 of the adapter 11, and the output terminal pins 18 are brought into contact with the relay terminal pins 25. The fastening screws (not shown) are inserted through the apertures 19 of the boss member 17 from the screw receiving holes 26 which firmly locks the cartridge 12 to the adapter 11. Thereafter, the mounting holes 21 are registered in position with the cartridge retaining holes 23 of the head shell 13, the housing 22 is fixed by screws to the head shell 13 and the connection 29 of the lead wires 28 is fitted into the relay terminal pins 25. In another form of the invention the mounting order can be changed wherein the adapter 11 is first mounted on the head shell 13, and the plug-in cartridge 12 is mounted on the adapter 11.

In another aspect of the invention the adapter 11 includes one or more grooves 30, such as shown in FIGS. 1 and 2. The grooves 30 operate to attenuate unwanted acoustic vibrations which could be transmitted to the stylus 15 and amplified by the electronic sound system (not shown). In a preferred form of the invention shown in FIGS. 1 and 2 a plurality of the grooves 30 have been found to be particularly effective in reducing low vibrational frequencies (<100 Hz). Furthermore, the mere presence of the additional material of the adapter 11 enables attenuation of higher frequencies, typically above about 500 Hertz. Such selected materials include most commercially available rigid plastics.

While there have been described herein various embodiments illustrative of the present invention, modifications of the present invention will be apparent only after study, and other matters being of routine design. As such, the scope of the invention should not be limited by the particular embodiment and the specific construction herein described, but should be defined by the appended claims and equivalents thereof.

What is claimed is:

1. An adapter assembly for a phonographic tone arm to permit the mounting of a plug-in P-mount cartridge in a head shell of a tone arm having mounting holes spaced approximately one-half inch apart, said P-mount cartridge having a plurality of axially extending contact pins and a rectangular mount portion, said adapter assembly comprising:
   an adapter housing having a recessed opening on a front side for engaging and making a substantially tight fitting contact with said rectangular mount portion to thereby securely hold said P-mount cartridge;
   a plurality of hollow terminal pins axially extending from a rear side opposite said front side, each of said hollow terminal pins accepting a corresponding one of said cartridge contact pins when said cartridge is engaged in said recessed opening; and
   fastening means for securing said adapter housing to said head shell and,
   a plurality of parallel grooves in said adapter housing for attenuating unwanted acoustic vibrations in said tone arm
   whereby said adapter assembly, in combination with said P-mount cartridge, has a mass and center of gravity which permits the facile maintenance of the tone arm balance.

2. The adapter as defined in claim 1 wherein said housing is constructed of a material suitable for absorbing said acoustic vibration in excess of 500 Hertz.

* * * * *